Feb. 25, 1969   L. F. KUSTWIN   3,429,556
COUPLING STOP ADJUSTMENT FOR ROTARY VALVES
Filed March 29, 1966

Inventor·
Leo Frank Kustwin,
By Joseph O. Long
Atty.

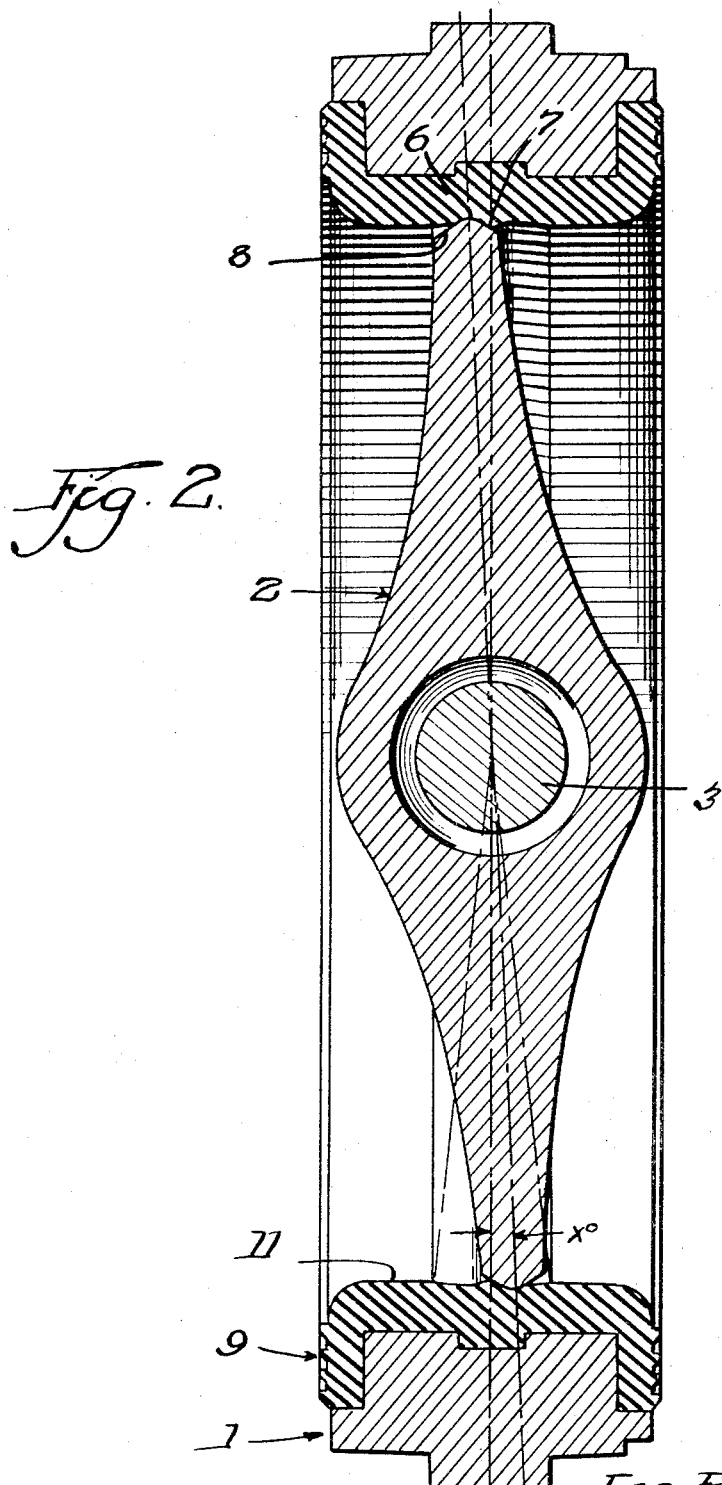

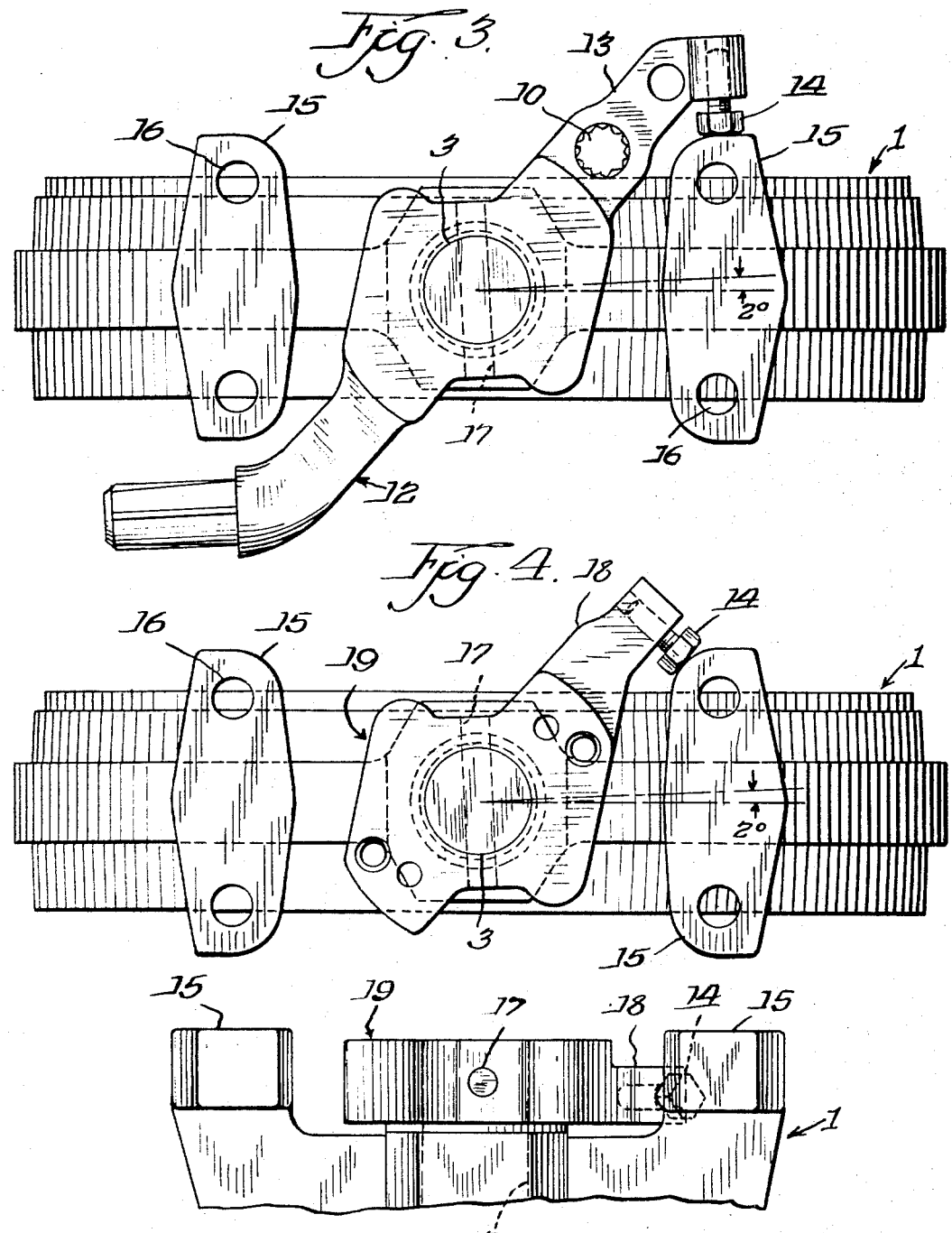

United States Patent Office 3,429,556
Patented Feb. 25, 1969

3,429,556
COUPLING STOP ADJUSTMENT FOR
ROTARY VALVES
Leo Frank Kustwin, Chicago, Ill., assignor to Crane Co.,
Chicago, Ill., a corporation of Illinois
Filed Mar. 29, 1966, Ser. No. 538,290
U.S. Cl. 251—285                                              1 Claim
Int. Cl. F16k 1/22, 25/00, 7/16

ABSTRACT OF THE DISCLOSURE

A novel adjustable stop means is provided for adjusting the rotative position of the closure member of a butterfly valve, of the type having a soft resilient seat having an interference fit between the inner surface of the annular seat and the outer peripheral portion of the closure member, so as to control the extent of interference fit at substantially the final rotative movement of the closure member in the closed position. The adjustable means is mounted on the valve shaft coupling for cooperation with mounting pads of the valve body to effect substantially 90° movement of the closure member. Control of the interference fit makes it possible to obtain fluid seat tightness for any desired pressure with the optimum or minimum torque to operate the valve.

---

This invention relates broadly to a rotary type of valve, and, more particularly, it is concerned with a coupling stop adjustment in the actuating mechanism for a butterfly valve closure member and the like.

In order to have a better appreciation and understanding of the merits of this contribution, the background of the critical service requirements and the shop assembly and test problems concerned with these valves should be understood, especially when it is realized that valve tightness is closely related with what is known by those skilled in the art as an interference fit between the valve closure member and the valve seat.

In butterfly valves particularly, there has long existed the difficult and perplexing problem of obtaining acceptable seat tightness. This problem has plagued butterfly valve manufacturers for a long time. In this connection, it should be understood that in valves of this type, relatively soft molded annular valve seats are employed and seat tightness is dependent upon the valve closure member having an optimum interference fit with said soft seat. It has also been the experience that when valves of this kind are stored for any length of time the inside diameter of the valve seat, for example, may change dimensionally and physically during the course of such storage and thereby adversely affect the accuracy of the peripheral fluid sealing contact between the butterfly valve closure member and said valve seat. Further, it should also be understood that depending upon the composition of the moldable material and the molding technique employed in forming the seat, the critical inside diameter dimension of the seat may change and thereby cause the objectionable leakage problem referred to.

In many cases where such leakage and excessive interference is encountered, it has been necessary to have the molds reworked, which is an expensive procedure.

It will thus be appreciated that in this type of valve in order to effect the desired seat tightness the interference fit developed between the periphery of the closure member and the inside cooperating surface of the valve seat is very critical. If the interference fit is inadequate, seat leakage results and if the interference fit is too great, the operating torque for the valve increases beyond reasonable limits.

It is, therefore, one of the more important objects of this invention to provide a mechanism cooperating with the actuating means of the valve whereby the problems above referred to are relatively easily, simply, and economically overcome.

Another object is to provide for a mechanism in which the adjustment can be made by relatively unskilled help and yet at the same time it will permit an adjustment to be made on the coupling of the valve stem actuating mechanism that will allow for stopping the rotation of the valve disc or closure member in a valve closing direction at a seating location that will produce fluid seat tightness at precisely the desired internal fluid pressure.

Another important object is to provide for an adjusting mechanism of the character hereinafter described in which such adjustment can be made quickly, conveniently and externally at the manufacturer's pump, and while the valve is actually under test pressure.

Another object of the invention is to provide for a valve actuating adjusting mechanism in which the operational deviation from the closed or ninety degree position of the disc will comprise a relatively small angle and of such degree as to in no way be detrimental to the performance of the valve.

Another important object is to provide for an adjusting tion in which a plus factor is provided in that a valve of the type equipped with the mechanism adjustment provided by this invention can as it develops a leak in service be easily readjusted to provide a tight valve seat.

Another important object is to provide for a valve adjusting mechanism in which the torque required to operate the valve would be made more consistent in relation to the valve size and line pressure encountered when such valves are so adjusted in accordance with the invention.

Another object is to provide for a single adjustment mechanism for valves in which due to the critical nature of rubber or the like, the critical dimensions in a valve seat vary substantially with age as well as with batch. This problem would be greatly minimized or even overcome by the use of the mechanism constituting this invention.

Another important object of the invention is to permit sub-assemblies being stocked without installation of the couplings and doing so without actual testing of the valves, the latter testing being postponed until such time as the valve operators are applied before shipment of the completed valves with the operators to the customers.

Other objects and advantages will become more readily apparent upon proceeding with the following description read in light of the accompanying drawings, in which:

FIG. 2 is a fragmentary transverse sectional view taken on the line 2—2 of FIG. 1;

FIG. 3 is a fragmentary plan view of the valve shown in FIG. 1 with the adjustment mechanism of this invention applied to a multi-lock lever and coupling of the type hereinafter referred to in greater detail;

FIG. 4 is a modification showing the adaptation to a coupling for a screw operator, cylinder operator and twist or latching lever subsequently referred to in detail;

FIG. 5 is a fragmentary front view of the mechanism described and illustrated in FIG. 4.

Similar reference numerals refer to similar parts throughout the several views.

Figure 1:
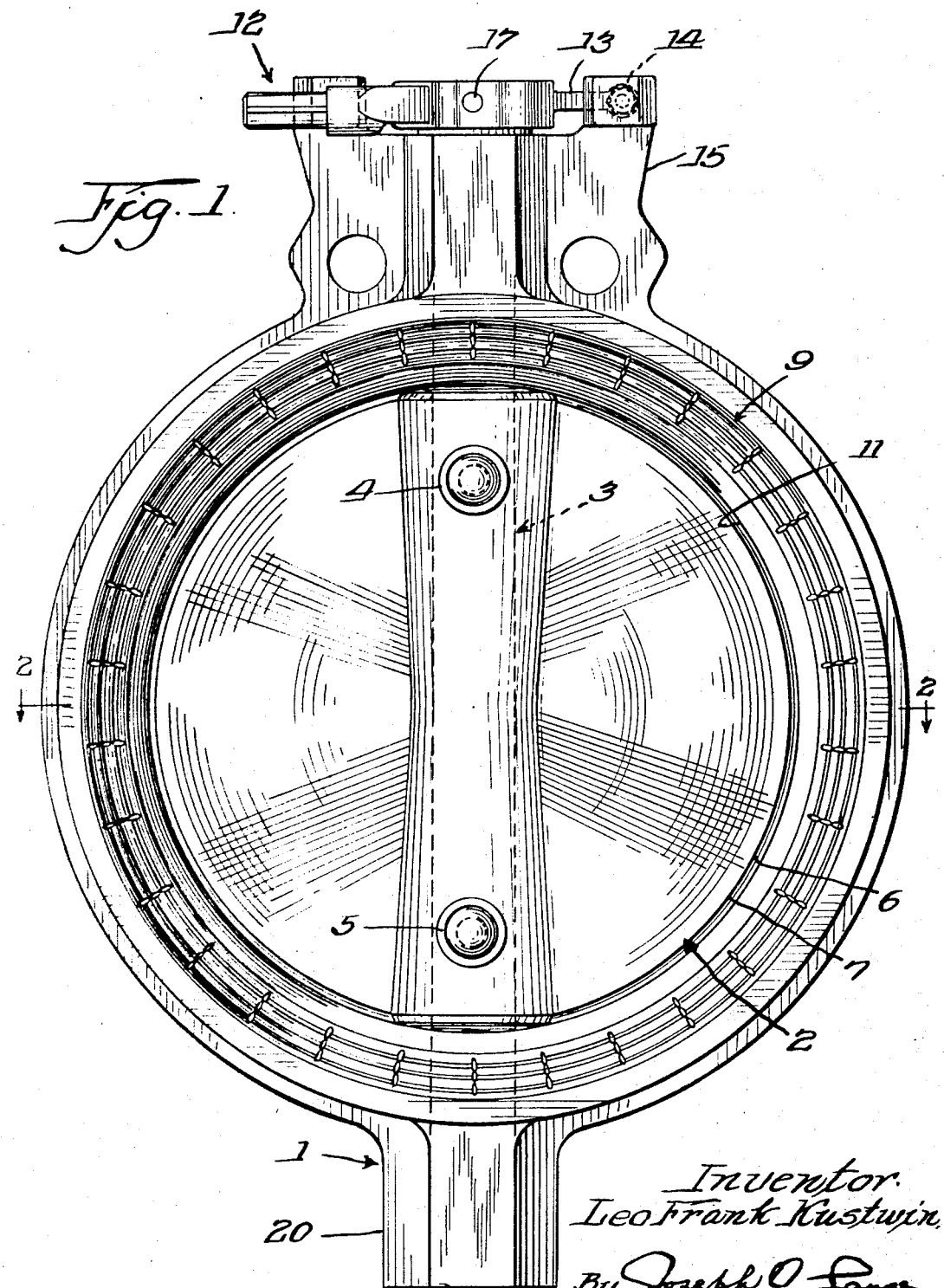
FIG. 1 is an end view of a butterfly valve of the general description shown in U.S. Patent No. 3,173,650, issued Mar. 16, 1965, and assigned to Crane Co., Chicago, Ill., with the adjustment mechanism of this invention mounted thereon.

Referring now to FIG. 1, an end view of a butterfly valve of the type described in said Patent No. 3,173,650 in greater detail is shown. The valve is provided with a body or casing generally designated 1 and the valve closure member generally designated 2. Actuated so as to rotate within a range of substantially ninety degrees in the said body by means of a rotatable valve stem or shaft designated 3, the closure member is attached to the latter member by means of the spaced apart pins 4 and 5 as shown. It will be noted that the valve closure member 2 is provided with a peripheral outer seating surface 6, the outer contour details of which are shown preferably formed as indicated at surfaces 7 and 8, which substantially converge as shown more clearly in the sectional view in FIG. 2.

The soft resilient seat preferably made of a suitable elastomer is generally designated 9 and is usually molded or otherwise fitted in position to assume the assembly configuration within the valve body 1 as shown more clearly in the sectional view of FIG. 2.

In acquiring an appreciation of the merits of this invention, it should be understood that the contact between the surfaces 6 and 11 provide by their dimensioning the interference fit referred to hereinabove. The degree of interference between said surface 6 and surface 11 provides varying degrees of fluid seat tightness and affects the rotative effort required to seat the closure member. For the reasons previously stated, this relationship between these surfaces constitutes a critical one, particularly when it is realized the physical changes take place in the elastomer seat which substantially affects the accuracy of the dimensions defining the surface 11 in its peripheral contact with the said closure member at 6 as mentioned. It must, therefore, be understood that an interference fit can vary substantially, especially when as in the past all closure member stops in the valve closed position were made fixed, that is, functioning only in one position and thereby controlling the rotative movement of the valve closure member 2 strictly within a range of ninety degrees. This condition of a fixed type of stop, therefore, caused the difficulties referred to because it was necessary to make and select the mating surface 6 and 11 within relatively close tolerances, frequently requiring rework and rejections during manufacture when rework was not practical, were substantial.

Therefore, it is the prime object of this invention to provide a relatively simple, but effective means for adjusting said critical relationship between the peripheral surface of the closure defined as at 6 and the inner molded surface 11 of the seat ring 9.

As shown in FIGS. 1 and 3, actuating means comprising a multi-lock lever operator coupling generally designated 12 is shown, which is adapted to fit non-rotatably on the valve shaft or stem 3 whereby to rotate said stem and said closure member through a range of rotation slightly less than ninety degrees, say, of the order of one-half to about four degrees, to provide an adjustable stop as immediately hereinafter described.

The multi-lock lever operator coupling referred to is of the type generally described in U.S. Patent No. 3,200,836, granted Aug. 17, 1965, and, therefore, it is deemed unnecessary to provide for further technical description of the latter member. Said coupling 12 includes the extension or arm 13 upon which is mounted the adjusting stop screw 14 as shown for contact in the desired valve closed position with the body spaced apart mounting pads 15. The latter are provided as indicated with the broached aperture 10 and suitable mounting apertures 16 for a locking device and valve position indicator as described in said latter mentioned patent.

The adjusting screw 14 is preferably provided with special locking characteristics in order that the degree of adjustment with respect to providing a stop for the coupling 12 is firmly established in effecting the desired rotative position of the closure member in the closed position of the valve as is shown more clearly in FIG. 2.

It should now be apparent by specific reference to FIG. 2 that the satisfactory closed positioning of the valve closure member 2 is adjustable accurately as required to provide the desired interference fit previously referred to. The latter position is perhaps best illustrated by reference to the angle designated X degrees. The angularity measured thereby is adjustable by rotation and the resultant axial positioning of said adjusting screw 14 against the stop of the body pad 15 as shown. The coupling 12 is pinned as at 17 to the valve stem 3 as shown in FIG. 1, the stem being journalled in the usual manner in the trunnion hub 20 of the body.

Referring now to the modified form of construction shown in FIG. 4, the general arrangement of the modified coupling is similar to that described in Patent No. 3,173,650, previously referred to. It is provided the extended arm 18 to carry the adjusting screw 14 functioning in the same manner and for the same purpose as described in connection with FIGS. 1 to 3 inclusive. This type of coupling is used with hydraulic cylinder operators and in connection with the twist or latching lever operator described in U.S. Patent No. 3,228,415, issued Jan. 11, 1966, and also with the screw type operator referred to in U.S. Patent No. 3,178,950, issued Apr. 20, 1965. With such references, further description of structure and function is deemed unnecessary.

Let it now be assumed that it becomes necessary in the valve assembly division of the manufacturer that a butterfly valve is to be prepared for test in order to meet a specification for fluid pressure ranges. Suitable pressure gauges are set up on the test rig and with the operating mechanism of the valve in place and provided with the adjustment means constituting this invention, the valve stop in the valve closing direction is adjusted by set screw 14 and set with the pressure ranges being applied as visually established to the test operator by the rig fluid pressure gauges. Thus, it will be clear that regardless of any slight variations in the seat inside diameter (of surface 11) of the seat 9 and the outside diameter of the closure member as at 6, the regular production valve bodies and discs are usable over a substantially larger range of dimensional tolerances and hardnesses of seat materials employed. Thus, the critical surface contact, as indicated at 6, with the annular valve seat surface 11 is easily adjustable by varying the angularity of the valve closure member in the valve closed or seated position shown, obtaining the desired interference fit for the valve pressures established by the rating of the valve. When it is realized that these valves are employed with valve operators of various types as hereinabove referred to, the matter of this adjustment and establishing the desired interference fit is obviously very important. Heretofore, when considering the variations encountered in the hardness of the seating material and dimensions during seat molding as well as tolerances in machining the outside diameter of the valve closure member, the difficulties as previously stated were many and serious. This invention has overcome the problems referred to.

While several embodiments have been shown and described, it will, of course, be appreciated that the invention is capable of being used with other types of valve operating mechanisms and other types of valves having similar problems.

Also, it should be understood that the location of the adjustable stop may vary and may, for example, be located at or on the lower end of the trunnion hub 20 of the body 1 instead of being positioned as shown and described in the above description. In the latter modification, the valve stem 3 could extend beyond the lower body hub portion 20 to accomplish a similar means for effecting adjustment broadly of the valve actuating mechanism employed. Thus, it will be clear that the location of the adjusting mechanism for the actuating means can easily be made applicable to other portions of the valve body in relation to the valve stem. The invention is capable of being applied to a wide variety of applications and the spirit of the invention should be measured by the scope of the appended claim, as follows.

I claim:

1. In a valve and a body therefor having a rotatable substantially round closure member rotatively adjustable through approximately 90°, an annular seat therewithin for said closure member, the seat being of relatively soft resilient material and having an inside diameter slightly less than the diameter of the said closure member whereby to provide an interference fit between an inner surface portion of said annular seat and an outer peripheral portion of said closure member during the rotative movement of said closure member in a valve closing direction, closure member actuating means located exteriorly of the body with means thereon for attachment of an actuating mechanism, adjustable stop means on said actuating means cooperating with the said body and closure member for adjusting the rotative position of the said closure member relative to said interference fit at substantially the final rotative movement of the said closure member in the valve closing direction, said body having mounting pads to mount the said actuating mechanism, the said pads providing faces for engagement with the adjustable stop means to effect said adjustable rotative movement of the said closure member substantially concurrent with the latter member being in a valve closed position.

References Cited

UNITED STATES PATENTS

| | | | |
|---|---|---|---|
| 2,514,431 | 7/1950 | West | 251—285 X |
| 2,672,156 | 3/1954 | Le Carmure | 251—285 X |
| 2,965,354 | 12/1960 | Grove et al. | 251—285 X |
| 3,072,139 | 1/1963 | Mosites | 251—306 X |
| 3,173,650 | 3/1965 | Cotterman et al. | 251—306 |
| 3,394,914 | 7/1968 | Nagasato | 251—306 X |
| 2,816,729 | 12/1957 | Jensen | 251—306 X |
| 2,892,609 | 6/1959 | Bibbo | 251—306 X |
| 2,919,885 | 1/1960 | Daigle | 251—288 X |
| 3,048,363 | 8/1962 | Garrigan | 251—307 |
| 3,122,756 | 3/1964 | Bradley | 251—288 X |
| 3,204,928 | 9/1965 | Fawkes | 251—307 |

M. CARY NELSON, *Primary Examiner.*

R. C. MILLER, *Assistant Examiner.*